(12) United States Patent
Fotland et al.

(10) Patent No.: US 9,832,452 B1
(45) Date of Patent: Nov. 28, 2017

(54) ROBUST USER DETECTION AND TRACKING

(71) Applicant: Amazon Technologies, Inc., Reno, NV (US)

(72) Inventors: David Allen Fotland, San Jose, CA (US); David Wayne Stafford, Cupertino, CA (US); Matthew Liang Chaboud, San Francisco, CA (US); Michael Paul Touloumtzis, Brookline, MA (US)

(73) Assignee: Amazon Technologies, Inc., Reno, NV (US)

( * ) Notice: Subject to any disclaimer, the term of this patent is extended or adjusted under 35 U.S.C. 154(b) by 952 days.

(21) Appl. No.: 13/965,126

(22) Filed: Aug. 12, 2013

(51) Int. Cl.
*H04N 13/02* (2006.01)

(52) U.S. Cl.
CPC .................................. *H04N 13/02* (2013.01)

(58) Field of Classification Search
CPC ... G06F 3/01–3/013; G02B 2027/0187; G02B 2027/0179; G02B 27/0093; G06T 7/004; H04N 5/23219
See application file for complete search history.

(56) References Cited

U.S. PATENT DOCUMENTS

| | | | |
|---|---|---|---|
| 5,632,002 | A | 5/1997 | Hashimoto et al. |
| 6,266,059 | B1 | 7/2001 | Matthews, III et al. |
| 6,518,957 | B1 | 2/2003 | Lehtinen et al. |
| 7,301,526 | B2 | 11/2007 | Marvit et al. |
| 7,599,712 | B2 | 10/2009 | van der Meulen |
| 7,603,143 | B2 | 10/2009 | Kang et al. |
| 8,228,292 | B1 | 7/2012 | Ruiz et al. |
| 8,432,366 | B2 | 4/2013 | Hodges et al. |
| 9,026,939 | B2 | 5/2015 | Smus |
| 2003/0023435 | A1 | 1/2003 | Josephson |
| 2003/0023953 | A1 | 1/2003 | Lucassen et al. |
| 2003/0028382 | A1 | 2/2003 | Chambers et al. |
| 2004/0046795 | A1 | 3/2004 | Josephson et al. |

(Continued)

FOREIGN PATENT DOCUMENTS

| | | |
|---|---|---|
| EP | 2365422 A2 | 9/2011 |
| EP | 2365422 A3 | 1/2015 |

(Continued)

OTHER PUBLICATIONS

Niklfeld, Georg, et al., "Architecture for adaptive multimodal dialog systems based on voiceXML," Eurospeech 2001, 4 pages.

(Continued)

*Primary Examiner* — Michael Teitelbaum
(74) *Attorney, Agent, or Firm* — Polsinelli LLP

(57) ABSTRACT

Systems and approaches are provided for robustly detecting and tracking a user. Image data can be captured and processed to provide an estimated position and/or orientation of the user. Other sensor data, such as from an accelerometer and/or gyroscope, can be determined for a more robust estimation of the user's position and/or orientation. Multiple user detection processes and/or motion estimation approaches and their corresponding confidence levels can also be combined to determine a final estimated position and orientation of the user. The multiple user pose estimations and/or motion estimations can be combined via an approach such as probabilistic system modeling and maximum likelihood estimation.

21 Claims, 8 Drawing Sheets

(56) References Cited

U.S. PATENT DOCUMENTS

| | | |
|---|---|---|
| 2004/0080487 A1 | 4/2004 | Griffin et al. |
| 2004/0260438 A1 | 12/2004 | Chernetsky et al. |
| 2005/0212754 A1 | 9/2005 | Marvit et al. |
| 2006/0197753 A1 | 9/2006 | Hotelling |
| 2007/0002026 A1 | 1/2007 | Sadler et al. |
| 2007/0061148 A1 | 3/2007 | Cross et al. |
| 2007/0260972 A1 | 11/2007 | Anderl |
| 2008/0072155 A1 | 3/2008 | Detweiler et al. |
| 2008/0255850 A1 | 10/2008 | Cross et al. |
| 2009/0203408 A1 | 8/2009 | Athas et al. |
| 2010/0105443 A1 | 4/2010 | Vaisanen |
| 2010/0125816 A1* | 5/2010 | Bezos ............... G06F 1/1626 715/863 |
| 2010/0138680 A1 | 6/2010 | Brisebois et al. |
| 2010/0188328 A1 | 7/2010 | Dodge et al. |
| 2010/0283735 A1 | 11/2010 | Kim et al. |
| 2010/0328319 A1* | 12/2010 | Ikenoue ............ G06K 9/00355 345/474 |
| 2011/0032182 A1 | 2/2011 | Kim et al. |
| 2011/0193939 A1 | 8/2011 | Vassigh et al. |
| 2011/0205156 A1 | 8/2011 | Gomez et al. |
| 2011/0244924 A1 | 10/2011 | Jung et al. |
| 2012/0030637 A1 | 2/2012 | Dey et al. |
| 2013/0016129 A1 | 1/2013 | Gossweiler, III et al. |
| 2013/0044080 A1 | 2/2013 | Chiang |
| 2013/0050131 A1 | 2/2013 | Lee et al. |
| 2013/0050263 A1 | 2/2013 | Khoe et al. |
| 2013/0127719 A1 | 5/2013 | Yasutake |
| 2013/0187855 A1 | 7/2013 | Radakovitz et al. |
| 2013/0191779 A1 | 7/2013 | Radakovitz et al. |
| 2013/0207898 A1 | 8/2013 | Sullivan et al. |
| 2013/0265437 A1 | 10/2013 | Thörn et al. |
| 2013/0311508 A1 | 11/2013 | Denker et al. |
| 2013/0342480 A1 | 12/2013 | Moon et al. |
| 2013/0344859 A1 | 12/2013 | Abramson et al. |
| 2014/0210727 A1 | 7/2014 | Wassingbo |
| 2014/0282272 A1 | 9/2014 | Kies et al. |
| 2015/0019227 A1 | 1/2015 | Anandarajah |

FOREIGN PATENT DOCUMENTS

| | | |
|---|---|---|
| WO | WO 2012093779 A2 | 7/2012 |
| WO | WO 2013021385 A2 | 2/2013 |
| WO | WO 2013021385 A3 | 2/2013 |

OTHER PUBLICATIONS

Weimer, David, et al. "A Synthetic Visual Environment With Hand Gesturing and Voice Input," In Proceedings of the SIGCHI Conference on Human Factors in Computing Systems (CHI '89), May 1989, 6 pages.

\* cited by examiner

ROBUST USER DETECTION AND TRACKING

BACKGROUND

User detection and tracking, such as head and facial detection and tracking, has several important applications for users of computing devices, such as personal computers, tablets, smartphones, or head-mounted displays and other wearable computing devices (e.g., eyeglasses, visors, gloves, watches, wristbands, etc.). User detection and tracking can enable users to interact with computing devices in new and interesting ways. For example, a computing device can be configured to recognize certain head and facial gestures, such as head nods or rolls, eye winks or other ocular motion, or lip movement as input to the device to perform tasks upon recognition of the gestures. User detection and tracking can also streamline video conferencing by detecting, tracking, and transmitting user movement (e.g., facial expressions, hand waves) and rendering video from models of the video conference participants and the tracked user movement instead of capturing and streaming video. Virtual and augmented reality applications can also depend on head pose estimation to correctly render image or video data according to the current perspective of the user. Gaze estimation can be enhanced when the pose of the user's head is known. Speech recognition can be made more robust by monitoring user lip movement in conjunction with analysis of audio data. Certain three-dimensional (3-D) or stereographic displays may also depend upon head pose and/or gaze estimation. Thus, accurate user detection and tracking may be critical to a variety of functions of a computing device. User detection, however, can be challenging because of variations in appearance, scale, rotation, position, and orientation. Other factors such as camera characteristics, illumination conditions, and occlusion can also affect how a user is represented in an image. Thus, even the most accurate user detection and tracking algorithms may not be as precise as desired.

BRIEF DESCRIPTION OF THE DRAWINGS

Various embodiments in accordance with the present disclosure will be described with reference to the drawings, in which.

DETAILED DESCRIPTION

Figure 1A:
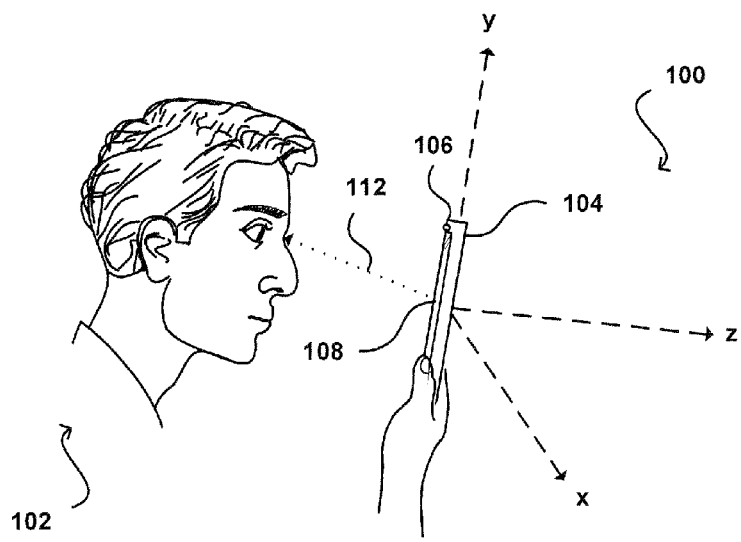
FIGS. 1A-1I illustrate an example approach for detecting and tracking a user in accordance with an embodiment.

Systems and methods in accordance with various embodiments of the present disclosure may overcome one or more of the aforementioned and other deficiencies experienced in conventional approaches for detection and tracking of users. In particular, various embodiments involve determining a position of a user with respect to a device, such as by analyzing image data utilizing a user detection process, and tracking the user by combining the results of one or more tracking processes and/or other motion detection processes, such as determined by inertial sensors (e.g., accelerometer, gyroscope, inclinometer, and/or magnetometer). As there are not necessarily any dependencies between image-based tracking and inertial sensor-based motion detection, the two approaches can be complementary. The failure of one approach may not result in failure of the entire tracking system. For instance, image-based tracking can be computationally costly and may incur an undesirable amount of latency. Inertial sensor-based motion detection, on the other hand, has relatively lower latency but can be subject to drift over time. By combining image-based tracking and inertial sensor-based motion detection, the tracking system in the aggregate may not be subject to deficiencies of conventional approaches that use one particular approach alone.

In some embodiments, one detection and/or tracking process can be used as a primary or predominant approach and the other technique(s) may be used as the secondary detection and/or tracking approach(es) to the extent the primary or predominant approach fails to detect and/or track the user. For example, the secondary detection and/or tracking approach(es) may be executed only if the probability, confidence level, error rate, or other such metric corresponding to the estimated position of the user as determined by the primary detection and/or tracking approach is below a threshold value. As another example, one particular detection and/or tracking process may be highly accurate but computationally expensive and a second detection and/or tracking process may be less processor-intensive but less accurate from a "cold start" yet highly effective when the initial user position is known. The device can be configured to use the first detection and/or tracking process to detect the user and track the user using the second detection and/or tracking process thereafter.

In some embodiments, input data from inertial sensors or other input devices can be used to optimize an object tracking system. For example, device motion data captured by one or more inertial sensors can be used as a cue for where to begin detecting and/or tracking of the user in image data or to limit regions of the image data for detecting and/or tracking the user. As another example, a device may be equipped with an ambient light sensor that can capture the amount of ambient light in the environment in which the device is being used. Certain detection and/or tracking processes may be more sensitive to illumination conditions than others, and such processes may be selected (or not selected) for detecting and tracking a user and/or such processes can be weighted based on the determined amount of ambient light.

In some embodiments, multiple image-based user detection and/or tracking processes can be executed simultaneously, other motion determination techniques can be performed, and/or other sensor data analyzed for detecting and tracking a user. The data obtained by these independent processes can be aggregated for more robustly detecting and tracking a user. In various embodiments, sensor fusion techniques can be used to combine data from multiple sensors of a computing device. Sensor fusion can be used to aggregate data captured by multiple sensors or input devices, such as multiple cameras, inertial sensors, infrared transceivers, GPS, microphones, etc., to obtain information of a state of an object of interest that may be more accurate and/or complete than would be possible from a single sensor alone. For example, conventional cameras may be limited to capturing 2-D images of objects of interest. However, images captured by multiple cameras with different fields of view can be used to analyze the object of interest in three dimensions. As another example, a conventional three-axis accelerometer may be limited to measuring linear acceleration along three dimensions (e.g., x-, y-, and z-axis) while a three-axis gyroscope may be limited to measuring rotational acceleration along three dimensions (e.g., roll, pitch, and yaw). By implementing sensor fusion, the sensor data captured by the accelerometer and the gyroscope can be used to derive motion according to six dimensions or six degrees of freedom (6DOF). As yet another example, sensor fusion can be applied to aggregate motion and/or position of an object of interest evaluated using image analysis and motion and/or position derived from inertial sensor data.

In some embodiments, a probabilistic system can be created that models the physics of user motion, device motion, and image capturing by cameras of the device. The probabilistic system can define as inputs probability estimates of user position and/or orientation from the camera(s) of the device, probability estimates of device position and/or orientation from the inertial sensor(s) of the device, and/or other probability estimates. The probabilistic system can define the position and/or orientation of the user with respect to the computing device as the output based on a maximum likelihood estimation (MLE) approach. Sensor fusion techniques and probabilistic approaches can include Kalman filtering, extended Kalman filtering, unscented Kalman filtering, particle filtering, among others.

Various other functions and advantages are described and suggested below in accordance with the various embodiments.

FIGS. 1A-1I illustrate an example approach of detecting and tracking a user in accordance with an embodiment. In the example situation 100 of FIG. 1A, a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 106 located on the front of the device and the on same surface as the display screen to capture image data of subject matter facing the front of the device, such as the user 102 viewing the display screen. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors, or other types of motion/orientation determination elements, such as accelerometers, gyroscopes, magnetometers, inclinometers, proximity sensors, distance sensors, depth sensors, range finders, ultrasonic transceivers, among others.

In this example, a vector 112 is shown from a point at the center of the display screen 108 to a point on the head of the user 102, such as between the user's eyes. Vector 112 is a three-dimensional vector that can be initially determined, for example, using a facial detection process performed on the image(s) captured by the camera 106. In other embodiments, the vector can be determined using sensors or other input devices of a computing system, such as inertial sensors or proximity sensors. In at least some embodiments, vector 112 can be used by the device to smoothly animate content displayed on the screen 108 to compensate for a change in perspective of the user with respect to the screen. In other embodiments, multiple vectors can be determined between the computing device and various features of the user, such as the user's eyebrows, eyes, irises, pupils, or mouth. In still other embodiments, other representations or models can be used to define the relationship between the user and the computing device, such as primitive geometric shapes (e.g., rectangle, ellipse, triangles, cylinders, ellipsoids), contours (e.g., edges comprising the boundaries of the user's head or face), silhouettes (e.g., regions within the contours of the user's head or face), etc.

Figure 1B:
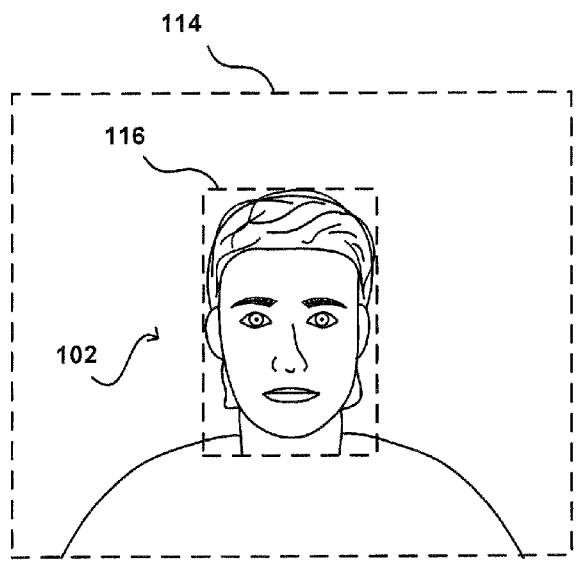
Figure 1C:
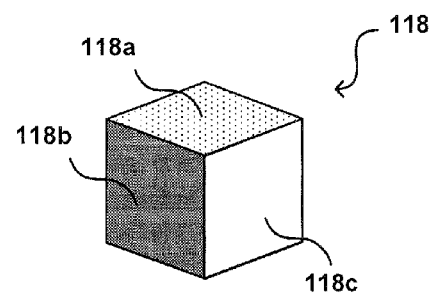

As illustrated in FIG. 1B, when the user 102 positions the computing device 104 directly in front of himself and gazes towards the display screen 108 straight on (i.e., the x-y plane of the device is parallel or substantially parallel to the user, where the lateral axis corresponds to the x-axis, the longitudinal axis corresponds to the y-axis, and the depth of the device or vertical axis corresponds to the z-axis), the image data captured by the camera 106 of the device can encompass the image 114. Although one image is shown to be captured in this instance, it will be appreciated that multiple images captured by a same camera at different times, multiple images captured by multiple cameras at a same time, or some combination thereof can be analyzed in various embodiments. Further, other embodiments may use other approaches, such as proximity sensors, to detect an object of interest with respect to a computing device. In this example, a user detection process is adapted for locating the head or face of a person. Here, the user detection process locates the head or face of the user 102 within the image 114 and provides as output the dimensions of a bounded box 116 indicating where the head or the face of the user is located in the image. In this example, the device is capable of rendering one or more three-dimensional graphical elements for display on the two-dimensional display screen 108 according to a first view or perspective of the user with respect to the display screen. The device relies on the pose of the head or face of the user with respect to the device and/or apparent motion of the user's head or face with respect to the device, as defined by vector 112, to render an appropriate perspective of a 3-D object as 2-D image data as illustrated in FIG. 1C, here, a cube 118 with a top surface 118a, a left front-facing surface 118b, and right front-facing surface 118c. The front-facing surfaces 118b and 118c appear to be equal in scale when the user gazes upon the display screen 108 straight on.

Figure 1D:
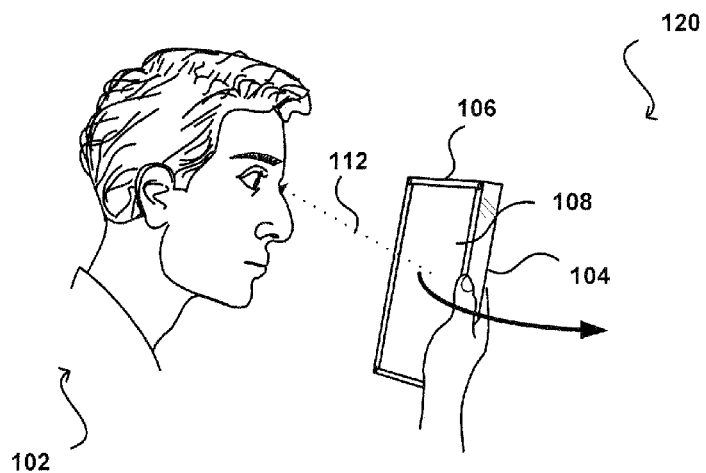
Figures 1E, 1F:
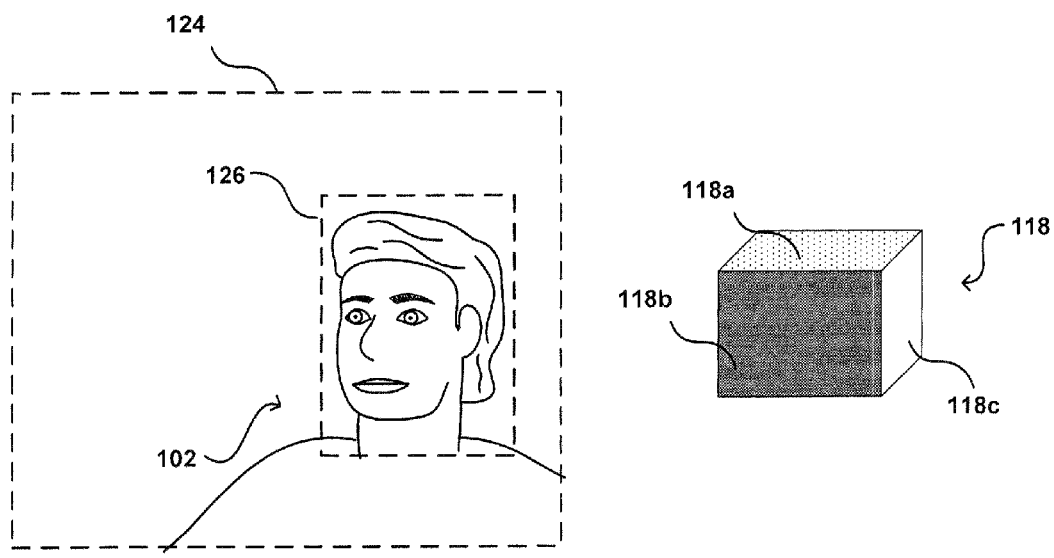
Figure 1G:
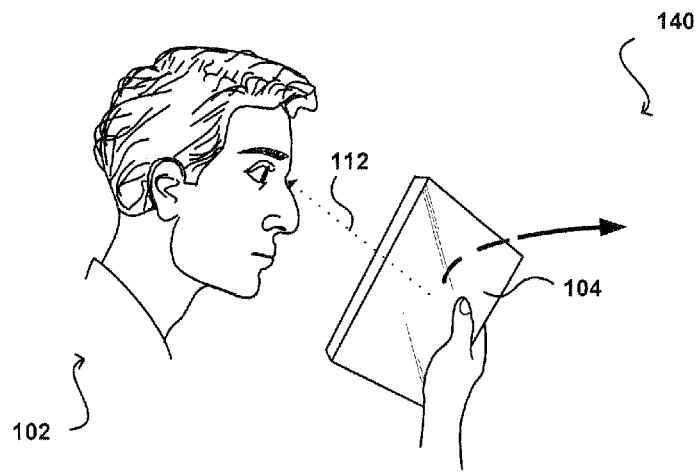
Figure 1H:
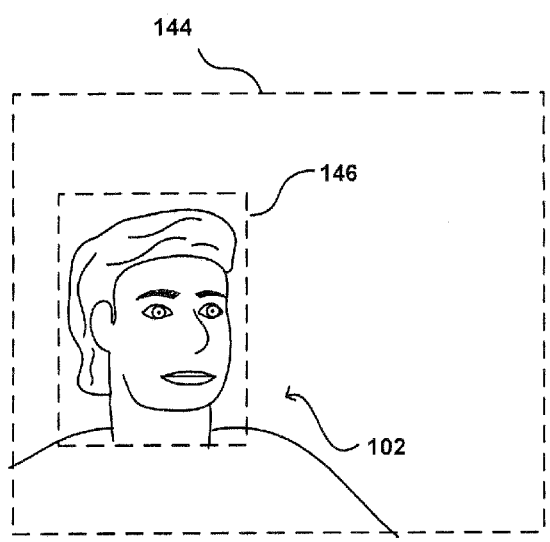
Figure 1I:
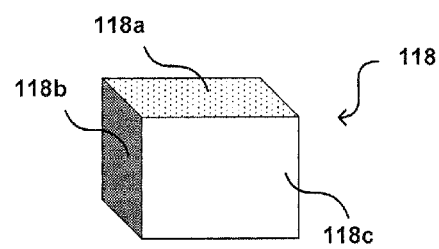

In FIG. 1D, an example situation 120 illustrates that the user 102 has tilted the computing device 104 to the right with respect to the perspective of the user, i.e., the user has rotated the device to his right along the longitudinal or y-axis, to obtain a second view or perspective of the 3-D object 118 depicted in FIG. 1F. As seen in FIG. 1E, the tilt or rotation of the device causes the camera 106 to capture a different view or perspective of the user within image 124, here, a three-quarters profile of the head or face of the user facing leftward. The position of the user's face may also be shifted towards a right region of the image because of the tilt or rotation of the device. In this example, the apparent motion of the face or head of the user (which is primarily due to the motion of the device) is tracked from the initial position detected in FIG. 1B to the new position depicted in FIG. 1E. For instance, the 3-D vector 112 between the point between the user's eyes and the center of the front face of the device is recalculated based on the new position and orientation of the user with respect to the computing device. Based on the apparent movement of the user's head or face, the 3-D object 118 is re-rendered for display on the display screen 108 to correspond to the new perspective of the user 102. For example, as the user tilts the device rightward, the device will render and/or animate the 3-D cube 118 such that the left front-facing surface 118*b* of the cube appears more prominently on the display screen and the right front-facing surface 118*c* appears at a more oblique angle.

FIG. 1E, an example situation 140 illustrates that the user 102 has tilted the computing device 104 to the left with respect to the perspective of the user, i.e., the user has rotated the device to his left along the longitudinal or y-axis, to obtain a third view or perspective of the 3-D object 118. As seen in FIG. 1F, the tilt or rotation of the device causes the camera 106 to capture a three-quarters profile of the head or face of the user facing rightward, and the position of the user's face has also shifted towards a left region of the image. In this example, the apparent movement of the face or head of the user (which, again, is primarily due to the movement of the device) is tracked from a previous position to the new position depicted in FIG. 1F. The 3-D object 118 can be re-rendered for display on the display screen 108 based on the apparent motion of the user's head or face. For example, as the user tilts the device towards his left from the position depicted in FIG. 1B, the box will transition or be animated from the perspective seen in FIG. 1D to the perspective seen in FIG. 1B when the x-y plane of the device is parallel or substantially parallel to the user. As the user continues rotating the device towards his left, the 3-D cube 118 will transition or be animated from the perspective seen in FIG. 1B to the perspective seen in FIG. 1F wherein the right front-facing surface 118*c* of the cube 118 appears more prominently on the display screen and the left front-facing surface 118*b* appears at a more oblique angle. When the user tilts the device forward (i.e., rotating the device along the x-axis such that the top portion of front of the device is further away from the user and the bottom portion of the front of the device is closer to the user), details of a bottom surface (not shown) of 3-D cube 118 may be displayed and the top surface 118*a* may be hidden. Likewise, tiling the device backwards (i.e., rotating the device along the x-axis such that the top portion of the front of the device is closer to the user and the bottom portion of the front of the device is farther from the user), will cause the top surface 118*a* to be displayed more prominently. It will be appreciated that objects, such as the head or face of the user, can generally be tracked according to six degrees of freedom (e.g., motion along the x-, y-, and z-axes or forward/backward, up/down, and left/right, and rotation along the x-, y-, and z-axes or pitch, yaw, and roll) and the device can be configured to appropriately respond to such various motions. For example, when the user tilts the device backwards and to his right (i.e., such that the top left corner of the device is the closest point of the device to the user), the top surface 118*a* and left front-facing surface 118*b* of the cube may be displayed more prominently and the right front-facing surface 118*c* may be appear at a more oblique angle and the bottom surface may remain hidden. When the user tilts the device forward and towards his left (i.e., such that the bottom right corner of the device is the closest point of the device to the user), the bottom surface and right front-facing surface 118*c* can be displayed with more details, and the top surface 118*a* and left front-facing surface 118*b* may appear more obscured or hidden.

As mentioned, in some embodiments, tracking of the vector (or other representation of a user) can be based on analyzing the change in position and/or orientation of the user between a first image, such as image 114 of FIG. 1B, and a second image, such as image 124 of FIG. 1E. For example, one or more cameras of a device can be calibrated in order to recover 3-D quantitative measures about an object of interest represented in 2-D images captured by the camera(s), such as a distance of the object of interest from the device, the height of the object of interest, etc. Various approaches can be used for camera calibration, such as direct linear transformation (DLT); the algorithm set forth in Tsai, Roger, "A versatile camera calibration technique for high-accuracy 3D machine vision metrology using off-the-shelf TV cameras and lenses," *Robotics and Automation, IEEE Journal of* 3, no. 4 (1987): 323-344; and the algorithm set forth in Zhang, Zhengyou, "A flexible new technique for camera calibration," *Pattern Analysis and Machine Intelligence, IEEE Transactions on* 22, no. 11 (2000): 1330-1334, each of which are incorporated herein by reference.

In other embodiments, tracking of the vector can be based on input data captured using one or more sensors or other input devices of a computing system. For instance, a proximity sensor can be used to estimate an initial position of an object of interest with respect to the device. An accelerometer can measure the acceleration of a device and the change in the position of the device can be derived via double integration of the data obtained from the accelerometer. A gyroscope can measure the rate of change of the device's orientation (i.e., angular velocity) and the change in angular position of the device can be calculated by integration of the measured velocity. Fusion of the input data obtained by the accelerometer and gyroscope may provide updated dimensions of the vector between the user and the computing device.

In still other embodiments, a combination of image-based tracking and tracking by inertial sensors can be used to track an object of interest. As mentioned, image-based tracking and inertial sensor-based tracking can be complementary. For example, inertial sensors may not be capable of differentiating between a change in inclination of a device from acceleration of the device. Further, there may be greater uncertainty associated with measurements by inertial sensors at slow motion than at high velocities. That is, inertial sensors may be more accurate at very high velocities and accelerations but less accurate at lower velocities and accelerations. Cameras and other imaging elements, on the other hand, can track features of an object of interest accurately at low velocities. However, image-based tracking may be less accurate at higher velocities due to motion blur and the effect of camera sampling rate. In addition, for high velocities and accelerations, cameras with higher frame rates may be bandwidth-limited by real time tracking requirements. It may also be difficult to distinguish motion due to translation and motion due to translation for certain objects of interest. Further, a near object of interest with low relative speed can appear the same as an object of interest further away with high relative speed.

In addition to the complementary characteristics of inertial sensors and cameras, differences between inertial sensor-based track and image-based tracking may also exist in relation to the processing requirements of these tracking approaches. Inertial sensor-based tracking may be less computationally expensive than image-based tracking because position information can be derived in constant time from data captured by inertial sensors while image-based track requires processing of at least a portion of a captured image. Image-based tracking, however, can be more reliable than inertial sensors in determining a position of a user with respect to a device in certain instances. For example, if a device remains stationary but a user tilts his head, inertial sensors will indicate no change in position of the user with respect to the device. Image-based tracking, on the other hand, may be more likely to detect the motion of the user with respect to the device. As another example, a user may be operating a device in a moving vehicle. Inertial sensors may indicate that the device is moving according to the direction of the vehicle even though the user may remain stationary with respect to the device. Image-based tracking can be more reliable in determining the position of the user with respect to the device in such a scenario.

In various embodiments, aggregation of image-based tracking and inertial sensor-based tracking can be loosely coupled or tightly coupled. A loosely coupled approach can comprise independent imaging and inertial navigation systems, running at different rates, and exchanging information. Translational and angular velocity estimates from the inertial sensors can be used to predict device motion, and velocity estimates from image-based tracking can be used to bound integration errors in the inertial sensors. Prediction of device motion can make the feature correspondence process more robust and can reduce the search space, thus reducing processing and use of power. A tightly coupled approach combines raw data of the cameras and inertial sensors in a single, optimum filter, such as a Kalman filter or a particle filter, as discussed further elsewhere herein.

In certain situations, a user may remain stationary or a device will be moved such that movement of the user's face or head may be negligible relative to the movement of the device. In such situations, it may be preferable to use motion data detected by the inertial sensors of the device for tracking the position and orientation of the user after the user has initially been detected in image data. In some embodiments, a user's change in position can be determined primarily based on motion data detected by the device's inertial sensors. For example, in one embodiment, the motion data detected by the inertial sensors can be sampled at a rate of 100.0 ms to update the user's position with respect to the device, and image data can be sampled at a rate of every 5.0 s to ensure that the user's position as determined by the inertial sensors do not substantially drift from the user's actual position. An advantage of such an approach would be to reduce the amount of processing that may be required by image-based tracking and conserve the battery life of the computing device. In other cases, image-based tracking can be used as the predominant approach for tracking the position if the user with respect to the device, and motion detected by inertial sensors can be used as backup in the event image-based tracking fails. For instance, lighting may temporarily go out or the user may otherwise be temporarily occluded such that an image-based tracking process is unable to track the user. In such instances, motion data captured by inertial sensors can be used to extrapolate the position of the user until the tracking process is able to re-track the user or a user detection process is executed to reinitialize the user's position with respect to the device.

In various embodiments, input data from inertial sensors or other input devices can be used to improve a tracking system. In some embodiments, motion data captured by inertial sensors can be used to improve performance of image-based tracking. For example, the relative position and orientation of a computing device can be derived from the inertial sensor data when a user moves the computing device. Techniques for determining the position and orientation of a computing device from inertial sensor data is well known in the art and will not be discussed herein detail. The position and orientation obtained from the inertial sensors can be used to limit one or more regions of the image data to be analyzed by an image-based tracking process, which can optimize the image-based tracking process by circumscribing the image data needed to be searched by the image-based tracking process. Certain tracking processes track an object when a sufficiently good model of the object has been found, i.e., one with sufficiently small error. Computation time can be saved for such processes by initializing the tracking process to begin searching for the object at an expected position based on the inertial sensor data.

In some embodiments, an ambient light sensor can be used to improve performance a tracking system. For instance, certain image-based tracking processes may be more sensitive to changes in illumination than other tracking processes. When the amount of light determined by the ambient light sensor is determined to meet or exceed a threshold value, an illumination-sensitive tracking process can be selected as the primary tracking process and/or the illumination-sensitive tracking process can be weighted greater based on illumination conditions. Alternatively, when the amount of ambient light of the current environment is below a threshold value, illumination-sensitive tracking processes may be excluded as the primary tracking process or such processes can be weighted less.

Figure 2A:
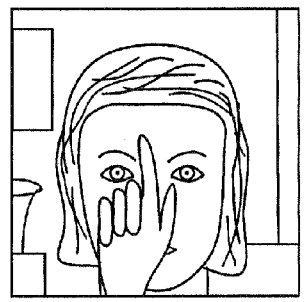
FIGS. 2A-2C illustrate stereoscopic image data that can be captured in accordance with various embodiments.
Figure 2B:
Figure 2C:

In some embodiments, a proximity sensor, depth sensor, distance sensor, structured lighting transceiver, and the like can be used to improve the robustness of a tracking system. For example, certain tracking processes capable of tracking an object in three-dimensional space can be more accurate with the distance or depth information provided by the proximity sensor, depth sensor, distance sensor, or structured lighting transceiver. In other embodiments, three-dimensional or stereoscopic image information can be captured using multiple cameras to provide three-dimensional point data, or disparity information that can be used to determine motion in three dimensions. FIGS. 2A and 2B illustrate images 200 and 220 that could be captured using a pair of cameras (e.g., stereoscopic cameras) embedded in a computing device. In various embodiments, the pair of cameras may capture the images simultaneously or substantially simultaneously and therefore would include at least some matching points of interest in their respective images. For example, the user's finger, nose, eyes, eyebrows, lips, or other features may be detected or tracked by the computing device in both images by using the various techniques discussed elsewhere herein. FIG. 2C illustrates an example combination image 240 showing the relative position of various objects in the captured images 200 and 220 if those images were "overlaid" or "superimposed" the amount of disparity, or lateral offset, between objects in the images. Objects closer to the device, such as the finger, have relatively large amounts of disparity. Objects farther away from the device, such as a painting on the wall, have relatively small amounts of disparity. Objects between these two areas will have intermediate amounts of disparity based upon the relative distance of those objects from the cameras.

Figure 3:
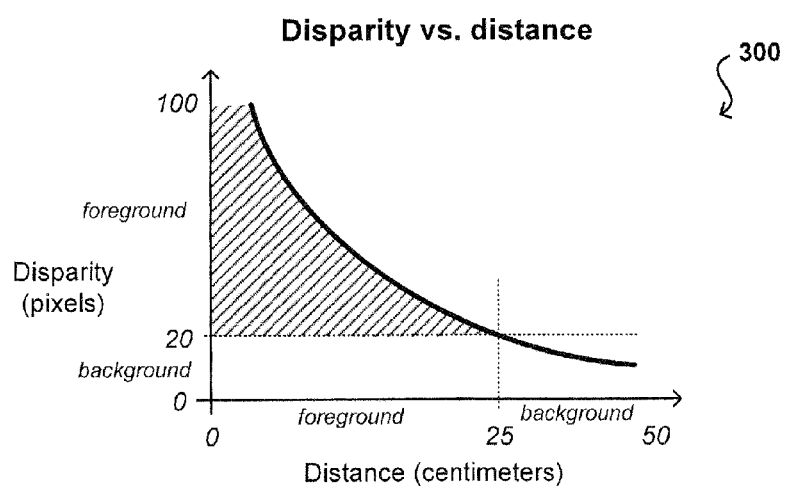
FIG. 3 illustrates an example plot showing a relationship of disparity with distance for an example stereoscopic imaging process that can be used in accordance with various embodiments.

FIG. 3 illustrates an example plot 300 showing a relationship of disparity with respect to distance. As illustrated, the amount of disparity is inversely proportional to the distance from the cameras, such that there can be significantly more disparity in the near camera field (e.g., 0 to 1.0 m) than in the far field (e.g., 1.0 m to infinity). Further, the decrease is not linear but decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 300 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, fingertips, etc.) in the stereo images, and determine the approximate distance between those feature points and the computing device. For example, the amount of disparity, D, at a given distance, d, can be represented by the relationship:

$$D = f \times B / d$$

where f is the focal length of each of the matched cameras and B is the baseline, or distance between the viewpoints of the cameras based at least in part upon their relative positions and separation. In this example, if the focal length of a camera is four hundred pixels and the baseline is five centimeters, for a distance of one meter the disparity would be twenty pixels. Based on relationships such as this one, the computing device may be able to determine the distance between the object of interest and the device. Various other approaches can be utilized as well as should be apparent to one of ordinary skill in the art in light of the teachings and suggestions contained herein.

In various embodiments, a user detection process is used to detect a user or a portion of a user (e.g., head, face, hands) in image data and determine an initial position and/or orientation of the user in the image data. Various approaches can be used to detect a user within the image data. Techniques for detecting a user can sometimes be characterized as either feature-based or appearance-based. Feature-based approaches generally involve extracting features from an image and applying various rules, metrics, or heuristics to determine whether a person is present in an image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the grouping of edges method. In the grouping of edges method, an edge map (generated via, e.g., a Canny detector, Sobel filter, Marr-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of a user, such as eyes, nose, and/or mouth. Certain high-level feature-based methods can be characterized as top-down or bottom-up. A top-down approach first attempts to detect a particular user feature (e.g., head or face) and then validates existence of a person in an image by detecting constituent components of that user feature (e.g., eyes, nose, mouth). In contrast, a bottom-up approach begins by extracting the constituent components first and then confirming the presence of a person based on the constituent components being correctly arranged. For example, one top-down feature-based approach is the multi-resolution rule-based method. In this embodiment, a person is detected as present within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a face may include the upper round part of a face comprising a set of pixels of uniform intensity, the center part of a face comprising a set of pixels of a second uniform intensity, and the difference between the intensities of the upper round part and the center part of the face being within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another top-down approach, face candidates are located based on the Kanade projection method for locating the boundary of a face. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes. Detection rules for eyebrow/eyes, nostrils/nose, and mouth or similar approaches can be used to validate whether the candidate is indeed a face.

Some feature-based and appearance-based methods use template matching to determine whether a user is represented in an image. Template matching is based on matching a pre-defined face pattern or parameterized function to locate the user within an image. Templates are typically prepared manually "offline." In template matching, correlation values for the head and facial features are obtained by comparing one or more templates to an input image, and the presence of a face is determined from the correlation values. One template-based approach for detecting a user within an image is the Yuille method, which matches a parameterized face template to face candidate regions of an input image. Two additional templates are used for matching the eyes and mouth respectively. An energy function is defined that links edges, peaks, and valleys in the image intensity profile to the corresponding characteristics in the templates, and the energy function is minimized by iteratively adjusting the parameters of the template to the fit to the image. Another template-matching method is the active shape model (ASM). ASMs statistically model the shape of the deformable object (e.g., user's head, face, other user features) and are built offline with a training set of images having labeled landmarks. The shape of the deformable object can be represented by a vector of the labeled landmarks. The shape vector can be normalized and projected onto a low dimensional subspace using principal component analysis (PCA). The ASM is used as a template to determine whether a person is located in an image. The ASM has led to the use of Active Appearance Models (AAMs), which further include defining a texture or intensity vector as part of the template. Based on a point distribution model, images in the training set of images can be transformed to the mean shape to produce shape-free patches. The intensities from these patches can be sampled to generate the intensity vector, and the dimensionality of the intensity vector may be reduced using PCA. The parameters of the AAM can be optimized and the AAM can be fit to an object appearing in the new image using, for example, a gradient descent technique or linear regression.

Various other appearance-based methods can also be used to locate whether a user is represented in an image. Appearance-based methods typically use classifiers that are trained from positive examples of persons represented in images and negative examples of images with no persons. Application of the classifiers to an input image can determine whether a user exists in an image. Appearance-based methods can be based on PCA, neural networks, support vector machines (SVMs), naïve Bayes classifiers, the Hidden Markov model (HMM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include Rowley's multilayer neural network, the autoassociative neural network, the probabilistic decision-based neural network (PDBNN), the sparse network of winnows (SNoW). A variation of neural networks are deep belief networks (DBNs) which use unsupervised pre-training to generate a neural network to first learn useful features, and training the DBN further by back-propagation with trained data. Such an approach is discussed in Huang, Gary B. et al. "Learning hierarchical representations for face verification with convolutional deep belief networks." *In Computer Vision and Pattern Recognition (CVPR), 2012 IEEE Conference on*, pp. 2518-2525. IEEE, 2012, which is incorporated herein by reference.

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities, i.e., $$\frac{P(\text{image}|\text{object})}{P(\text{image}|\text{non-object})} > \frac{P(\text{non-object})}{P(\text{object})}.$$

In HMM-based approaches, face patterns are treated as sequences of observation vectors each comprising a strip of pixels. Each strip of pixels is treated as an observation or state of the HMM and boundaries between strips of pixels are represented by transitions between observations or states according to statistical modeling. Inductive learning approaches, such as those based on Quinlan's C4.5 algorithm or Mitchell's Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. The Viola-Jones detector is discussed in Viola, Paul et al. "Rapid object detection using a boosted cascade of simple features." *In Computer Vision and Pattern Recognition, 2001. CVPR 2001. Proceedings of the 2001 IEEE Computer Society Conference* on, vol. 1, pp. 1-511. IEEE, 2001, which is incorporated herein by reference.

Surveys of various approaches of user detection are discussed in Yang, Ming-Hsuan et al., "Detecting faces in images: A survey." *Pattern Analysis and Machine Intelligence, IEEE Transactions* on 24, no. 1 (2002): 34-58 and Hjelmås, Erik et al. "Face detection: A Survey." *Computer Vision and Image Understanding* 83, no. 3 (2001): 236-274, which are each incorporated herein by reference.

Figure 4A:
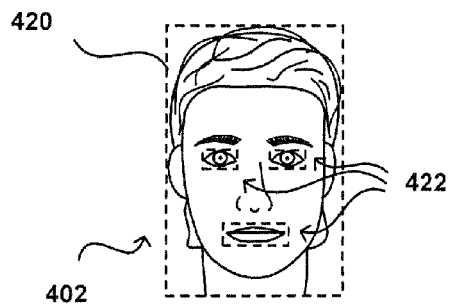
FIGS. 4A-4F illustrate examples of tracking a user in accordance various embodiments.

After at least a portion of a user has been detected in image data captured by a computing device, approaches in accordance with various embodiments track the detected portion of the user. FIGS. 4A-F illustrate certain approaches that can be utilized for detecting and tracking a user in accordance with various embodiments. FIG. 4A illustrates an example wherein the approximate position and orientation of the head of a user 402 has been determined and a virtual "box" 420 is placed around the user's head using one or more of the various user detection processes discussed herein. A similar or different approach can also be used to determine an approximate location and area 422 of each of the user's eyes (or in some cases the eyes in tandem) and mouth or other facial features. By determining the location of the user's eyes and mouth as part of facial detection, advantages may be obtained as it can be more likely that the image determined to be the user's face actually includes the user's face, and it can be determined that the user is in front of the device. Further, the relative movement of the user's eyes and mouth can be easier to detect than the overall movement of the user's face when the user is performing motions such as nodding or shaking the head back and forth.

Figure 4B:
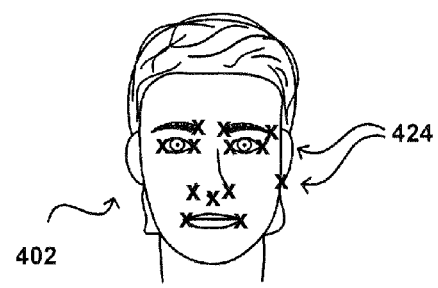

Various other approaches can also be used to track the user. For example, FIG. 4B illustrates an example wherein various features on a user's face are identified and assigned a point 424 in the image. The system thus can detect various aspects of user facial features and can determine changes such as movement or change in shape or expression. Such an approach can provide advantages over the general approach of FIG. 4A in certain situations, as various points along a facial feature can be determined, such as the end points and at least one center point of a user's mouth. Accordingly, expressions such as a smile or frown can be captured even though the overall position of the user's mouth or face did not move.

Figure 4C:
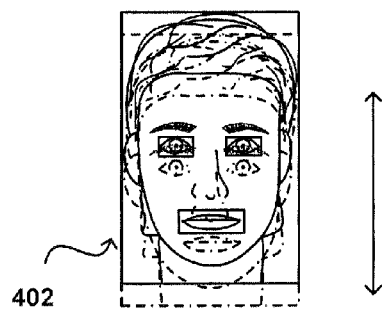
Figure 4D:
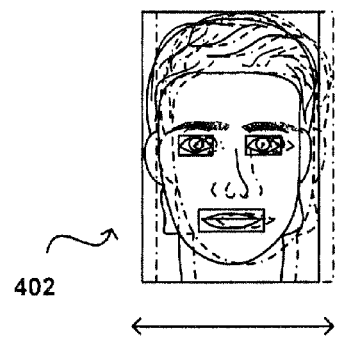
Figure 4E:
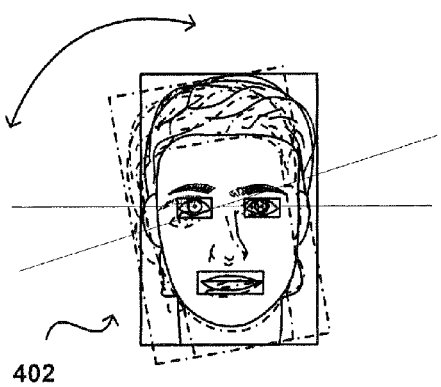

Once the facial features of a user are detected, relative motion or changes in facial expression can be tracked and utilized as input in accordance with various embodiments. For example, FIG. 4C illustrates an example where the user's head 402 is moving up and down with respect to the viewable area of the imaging element. As discussed, this could be the result of the user shaking his or her head, or the user moving the device up and down, etc, FIG. 4D illustrates a similar example wherein the user is moving right to left relative to the device, through movement of the user, the device, or both. As can be seen, each movement can be tracked as a vertical or horizontal movement, respectively, and each can be treated differently as an input to perform a specified function. As should be understood, various embodiments also can detect diagonal or other such movements. FIG. 4E further illustrates an example wherein the user tilts the device and/or the user's head, and the relative change in eye position is detected as a rotation. In some systems, a "line" that corresponds to the relative position of the eyes (or other facial features such as eyebrows, hairline, mouth, chin, ears, etc) can be monitored, and a shift in angle of this line can be compared to an angle threshold to determine when the rotation should be interpreted as input.

Figure 4F:
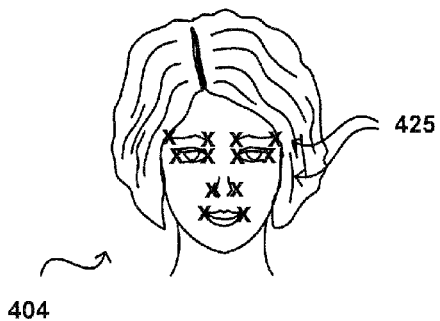

FIG. 4F illustrates another advantage of using an approach such as that described with respect to FIG. 4B to determine the position of various features on a user's face. In this example, it can be seen that the features of a head of a second user 403 have a different relative position and separation. Thus, a computing device also can not only determine positions and changes of facial features for a specific user, but can distinguish between different users. Also, the device can be configured to detect how close a user is to the device based on, for example, the amount and ratio of separation of various features, such that the device can detect movement towards, and away from, the device. This can help to improve the accuracy of facial tracking.

In some embodiments, information from other sensors of the computing device, such as information about the motion of the computing device may be used to enhance the head/face tracking, or other object tracking being performed by the device. For example, the computing device may include one or more cameras capable of capturing images of the user's head or other features (e.g., hands, fingers, facial features, etc.). The image data can be processed to perform facial recognition or gesture recognition for gestures that do not require a physical touch of the device, among other functionality. Conventionally, user detection and/or tracking can be computationally intensive and it may be desirable to optimize these processes by using the information about the motion of the computing device. For instance, if the computing device detects, based on inertial sensor data (e.g., accelerometer, gyroscope, inclinometer, and/or magnetometer), that the user has rotated the computing device such that the user's face is not likely to be within the view of the camera, the computing device may stop the process of user detection and/or tracking to conserve resources (e.g., CPU utilization, power, etc.). Similarly, if the device determines that the user is on a moving bus (e.g., as determined by a mobile payment application for bus fare) or other changing environment where the amount of light is periodically changing (e.g., as determined by an ambient light sensor), the computing device may choose to continue executing the head tracking process even though the user's face (or other features) may become undetectable during certain time intervals due to lack of light. In this manner, the computing device may utilize information about the motion of the device and other context to assist the processes for user detection and tracking.

Figure 5A:
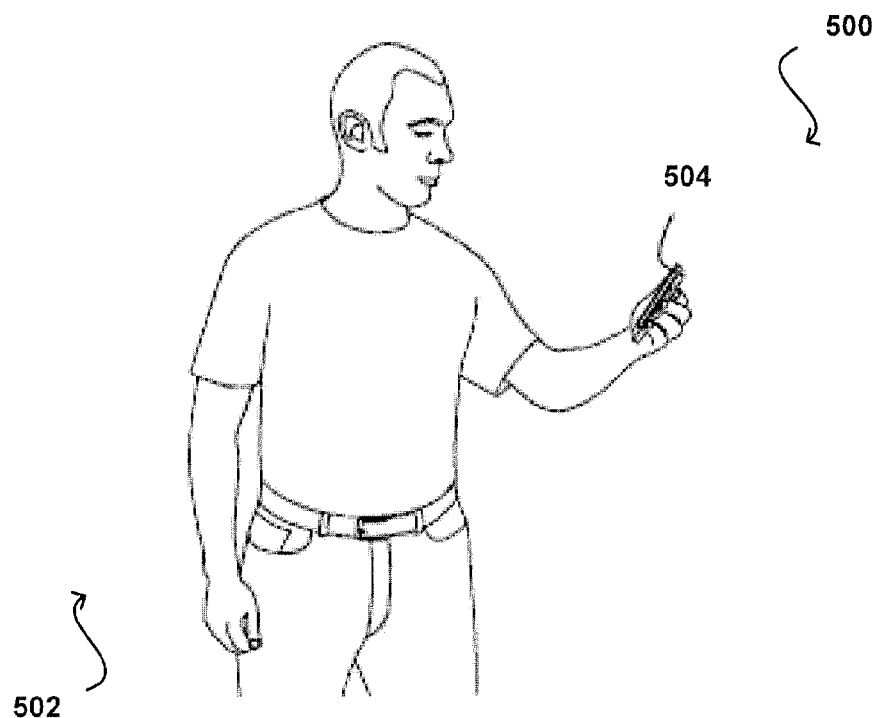
FIGS. 5A-5B illustrate example approaches for tracking a user in accordance with an embodiment.
Figure 5B:
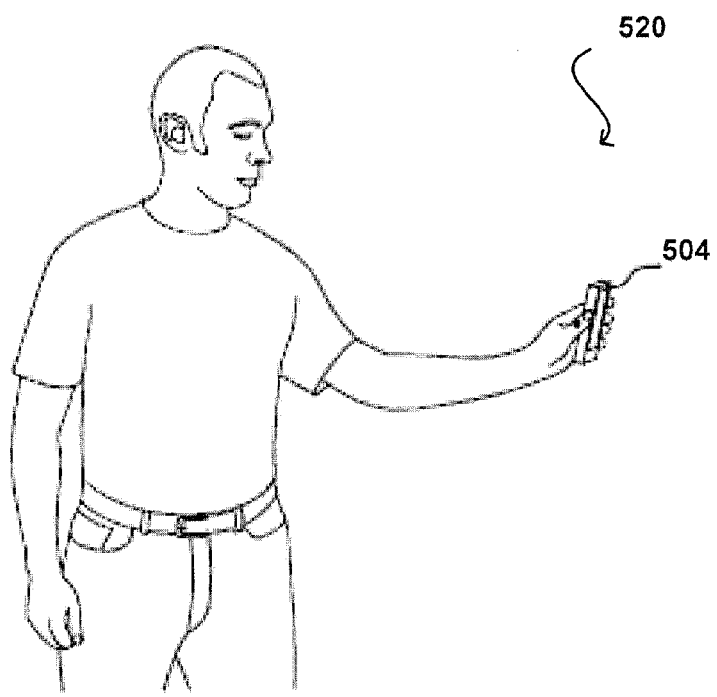

FIGS. 5A and 5B illustrate an example approach of using the motion of the computing device to supplement user detection and tracking in various embodiments. In FIG. 5A, the user 502 is holding a computing device 504, which in this example is shown to be a smartphone 504. The computing device may include one or more front-facing cameras that may capture images of the user's head, face, or other features and this image data may be analyzed for detecting and tracking a user as previously described. Because user detection and/or tracking typically can utilize a significant amount of resources, it may be useful for the computing device to leverage information about the motion of the device to enhance and supplement the user detection and/or tracking process. For example, it may be useful for the device to immediately detect (e.g., based on inertial sensor data) when the user has rotated or moved the device in such a way that the user would no longer be within the field of view of the front-facing camera(s). As shown in FIG. 5B, if the user turns the device around, the front-facing camera(s) would be facing away from the user and may have completely different objects within the field of view of the front-facing camera(s). One response to such detection may be for the computing device 504 to discontinue or suspend the user detection and/or tracking process rather than continue attempting to track the user. This may enable a more responsive user detection and/or tracking process.

Another example may be for the computing device to utilize the device motion information to continue the user detection and/or tracking process rather than discontinuing the process when the device is no longer detecting the user for short periods of time. For example, if the lighting conditions around the device are changing (e.g., when the user is on a moving train or bus), image data that can be analyzed may be captured when there is sufficient lighting and image data that cannot be analyzed may be captured when there is not enough lighting. Under such conditions, the device may analyze the movement information gathered by the sensors (e.g., accelerometer, gyroscope, light sensors, GPS receiver, etc.) and may determine that the computing device is likely located in a moving vehicle. Based on this determination, the computing device may elect to continue the user detection and/or tracking process uninterrupted (i.e., rather than repeatedly stopping and starting the process) based on the assumption that the user's face will soon once again become trackable due to the changing of the lighting conditions.

In some embodiments, user detection and tracking can be compensated, supplemented, or enhanced by motion estimation techniques that are based upon optical flow, such as block matching, differential methods, or phase correlation. Block matching is a correlation technique that searches for the best match between an image block of a current frame and a specified area of a previous frame. Differential techniques compute motion from spatial and temporal derivatives of image features such as intensities or filtered versions of the image. Differential methods include local methods and global methods. In various embodiments, local approaches based on the Lucas-Kanade optical flow algorithm can be used to determine inter-frame motion of an input video. The algorithm is set forth in Lucas, Bruce D. et al. "An iterative image registration technique with an application to stereo vision." *In Proceedings of the 7th international joint conference on Artificial intelligence.* 1981, and is incorporated herein by reference. The Lucas-Kanade algorithm estimates displacement of a neighborhood of pixels by analyzing changes in pixel intensity from the known intensity gradients of the image in that neighborhood. In other embodiments, a global approach, such as the Horn-Schunk algorithm or a variation thereof, can be used to determine inter-frame motion of an input video. The Horn-Schunk algorithm is set forth in Horn, Berthold K P et al. "Determining optical flow." *Artificial intelligence* 17, no. 1 (1981): 185-203, which is incorporated herein by reference. Horn-Schunk uses a global regularization calculation as an additional constraint.

In some embodiments, phase correlation is used to determine inter-frame motion of an input video. Phase correlation is a frequency domain technique based on the shift property of the Fourier transform for measuring motion. To determine inter-frame motion using phase correlation, the cross power spectrum (CPS) of two frames is determined. If one frame is a shifted replica of the other, i.e., $f_2(x,y)=f_1(x+x_0, y+y_0)$ then the phase of the cross power spectrum of the two frames $f_1$ and $f_2$ can be defined as:

$$CPS(f_1, f_2) = \frac{F_1(\xi, \eta) \cdot F_2^*(\xi, \eta)}{|F_1(\xi, \eta) \cdot F_2^*(\xi, \eta)|} = e^{j2\pi(\xi x_0 + \eta y_0)}$$

where F is the Fourier transform of the frame f and F* is the complex conjugate. The inverse Fourier transform of the cross power spectrum is an impulse whose coordinates are located at $(x_0, y_0)$, the required shift.

In various embodiments, a position and/or orientation of a user can be determined more robustly by combining results of an image-based user detection and/or tracking process with additional data, such as position estimates from one or more other image-based user detection and/or tracking processes or motion estimates from inertial sensors and/or other motion detection processes (e.g., optical flow). In at least some embodiments, a probabilistic system can be defined that models the physics of user motion, device motion, and imaging capturing by cameras of the device. The system can receive as inputs position/orientation estimates from one or more image-based detection and/or tracking processes, device motion estimates from inertial sensors or optical flow techniques, other input data, and confidence levels associated with each of these inputs. The system can be modeled to output the position and/or orientation of the user using a maximum likelihood estimation (MLE) approach. Likelihood is closely related to the more familiar concept of probability. For example, the probability p of an event x, dependent upon model parameters θ, is defined as:

$$p(x|\theta).$$

The likelihood function l for θ, on the other hand, is defined as:

$$l(\theta|x) \equiv p(x|\theta)$$

That is, the likelihood l characterizes the parameters θ of the model given the observed data x. Maximum likelihood estimation aims to find the parameter(s) θ that make the observed data x most likely. MLE approaches can include Kalman filtering or variations thereof (e.g., extended Kalman filter, unscented Kalman filter), particle filtering, among others.

In Kalman filtering, the state of a linear system can be estimated based on a Gaussian distribution of the state. Kalman filtering comprises two steps prediction and correction. The prediction step uses the state model to predict the new state of the parameters of the model:

$$\overline{X}^t = \vec{D}X^{t-1} + W,$$

$$\overline{\Sigma}^t = \vec{D}\Sigma^{t-1}\vec{D}^T + Q^t,$$

where $\overline{X}^t$ is the state prediction at time t, $\overline{\Sigma}^t$ is the covariance prediction at time t, $\vec{D}$ is the state transition matrix correlating the relationship between the state parameters at time t and t−1, Q is covariance of the noise W. In the correction step, the current measurement Zt is used to update the object's state:

$$K^t = \overline{\Sigma}^t \vec{M}^T [\vec{M}\overline{\Sigma}^t \vec{M}^T + T + R^t]^{-1},$$

$$X^t = \overline{X}^t + K^t \underbrace{[R^t - \overline{M}\overline{X}^t]}_{v},$$

$$\Sigma^t = \overline{\Sigma}^t - K^t \vec{M} \overline{\Sigma}^t,$$

where v is referred to as the innovation, $\vec{M}$ is the measurement matrix, K is the Kalman gain (also referred to as the Riccati equation) used for propagation of the state model. When the system is nonlinear, a Taylor series expansion can be used to extend the Kalman filter.

When using a Kalman filter for tracking a user, the state of the Kalman filter may represent, for example, one or more of a position of the user relative to the device, a velocity or acceleration of the user with respect to the device, a position of the device, and motion of the device. The measurements used by the Kalman filter may include, for example, a location of the user as determined from camera images and measurements from inertial or other sensors of the device. For each new set of measurements obtained by the device the Kalman filter may be updated to obtain a new estimate of the location of the user relative to the device.

In particle filtering, the state of the object is modeled as a sampling probability instead of as a Gaussian distribution. Particle filtering models the conditional state density $P(X_t|Z_t)$ at time t as a set of samples or particles $\{s_t^n : n=1, \ldots, N\}$ with sampling probability or weights $\pi_t^n$. The weights are used to characterize the importance of a particular sample or particle. A common sampling technique is importance sampling, which includes selection of N random samples $\hat{s}_t^n$ from $\vec{S}_{t-1}$ by generating a random number r between 0 and 1 and finding the smallest j such that $c_{t-1}^{j-1} > r$ and setting $\hat{s}_t^n = \hat{s}_{t-1}^j$. In the prediction step, for each selected $\hat{s}_t^n$, a new sample is generated by:

$$s_t^n = f(\hat{s}_t^n, \vec{W}_t^n),$$

where $\vec{W}_t^n$ is a zero mean Gaussian error and f is a non-negative function, i.e., f(s)=s. In the correction step, weights $\pi_t^n$ corresponding to the new samples $s_t^n$ are calculated using the measurements $z_t$ by:

$$\pi_t^n = p(z_t | x_t = s_t^n),$$

where p can be modeled as a Gaussian density. Using the new samples $\vec{S}_t$, the new position of the object can be estimated using:

$$\epsilon_t = \Sigma_{n=1}^N \pi_t^n f(s_t^n, \vec{W}).$$

Figure 6:
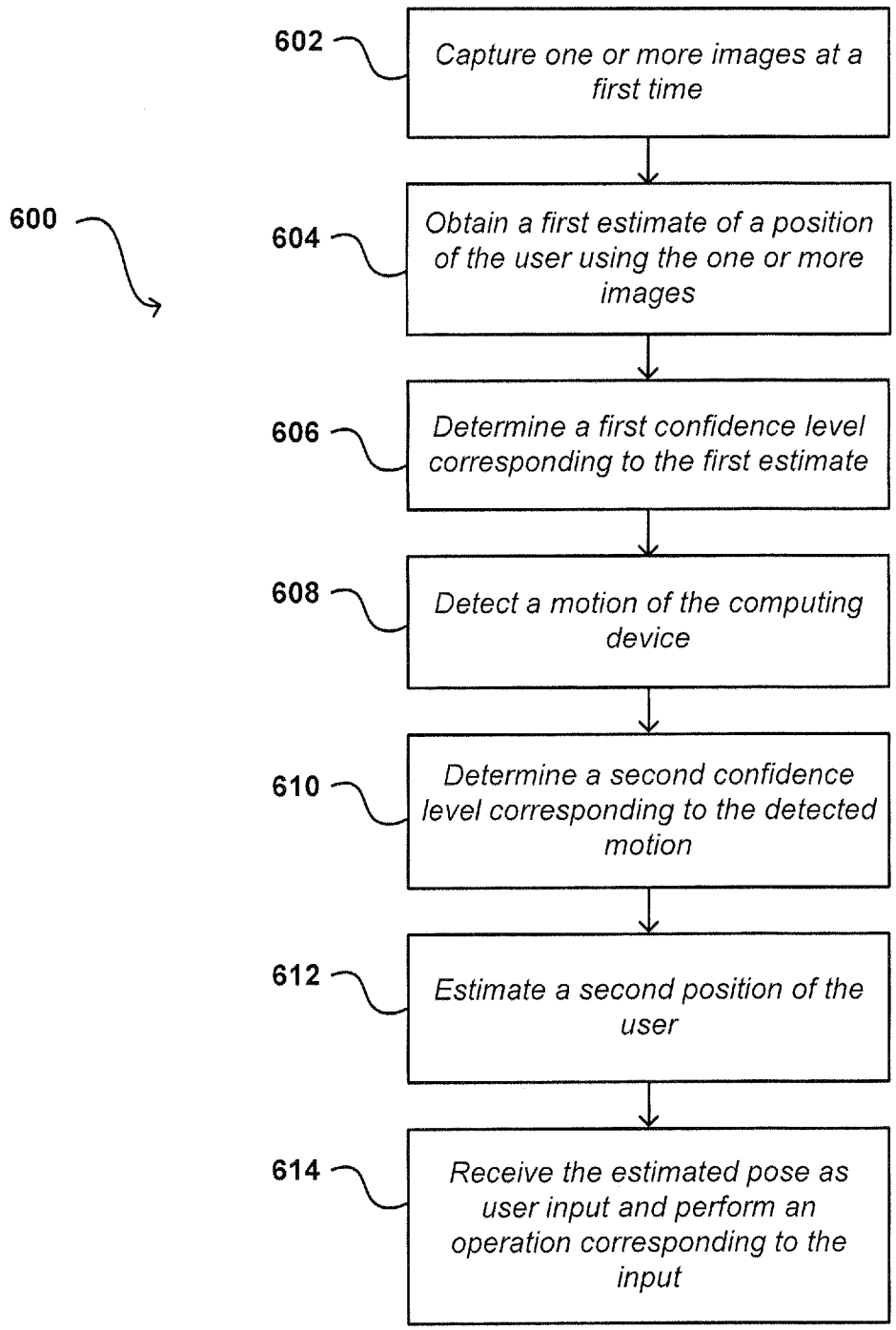
FIG. 6 illustrates an example process for detecting and tracking a user in accordance with an embodiment.

When using a particle filter for tracking a user, the states and measurements may be the same as when using a Kalman filter. For each new set of measurements obtained at the device the particle filter may be used, as described above, to obtain a new estimate of the location of the user relative to the device FIG. 6 illustrates an example process 600 for detecting and tracking a user in accordance with an embodiment. It should be understood that, for any process discussed herein, there can be additional, fewer, or alternative steps performed in similar or alternative orders, or in parallel, within the scope of the various embodiments unless otherwise stated. As discussed, user detection and tracking can be used for a variety of purposes, such as recognizing user gestures as input to a computing device, video conferencing, virtual reality, augmented reality, gaming, gaze estimation, user position and orientation estimation, security, machine lip reading, determining a display perspective, privacy or security control, among others. In this example, the process begins by obtaining image data 602. As used herein, image data can include a set of images captured at the same time or substantially at the same time by multiple cameras of a device. Image data can also include video frames captured at the same time or substantially at the same time by multiple video cameras of a device. Multiple images captured by cameras located at different locations of a computing device can be used to determine position and/or orientation of a user in three dimensions using an approach such as stereo disparity mapping, although certain embodiments can also determine 3D information if additional data from a proximity sensor, depth sensor, distance sensor, and the like is also available. In various embodiments, the image(s) can be pre-processed to improve the user detection and tracking method. Pre-processing can include histogram equalization or optimization, brightness and contrast optimization, color-cast correction, reduction or removal of noise (e.g., dark-current shot noise, photon shot noise, fixed pattern noise, bias noise, and quantization noise), reduction or removal of specular reflection, and other image optimization or enhancement techniques known to those of ordinary skill in the art. The pre-processed images are analyzed to detect the presence of a user within the image data and to estimate a first position and/or orientation of the user with respect to the computing device 604. As discussed, various embodiments may execute multiple user detection processes concurrently and combine the multiple position and/or orientation estimations using a number of different approaches. In some embodiments, the user detection process can provide a confidence level corresponding to a detection or non-detection of a user in the images 606. In other embodiments, the confidence level may be statically defined according to results from offline training of the detector and/or the receiver operating characteristic (ROC) curve for a particular process. Motion of a computing device can also be determined 608 at a second time, such as from sensor data of inertial sensors, motion estimation techniques, analysis of audio data, and other approaches known to those of ordinary skill in the art and/or disclosed or suggested by the teachings discussed herein. These various approaches can also be associated with a confidence level 610. The position and/or orientation of the user in the image data and its associated confidence level and the motion estimation and its associated confidence level can be used to determine a second estimate of the position of the user 612 based on the first estimate and the motion of the computing device. Various approaches can be used to estimate the position of the user from such data, including modeling a system used to capture the image and sensor data and parameterizing the user position and/or orientation according to a maximum likelihood estimation approach. The final estimated position and/or orientation of the user may correspond to user input, and a computing device can perform an action corresponding to the determined user input 614.

Figure 7:
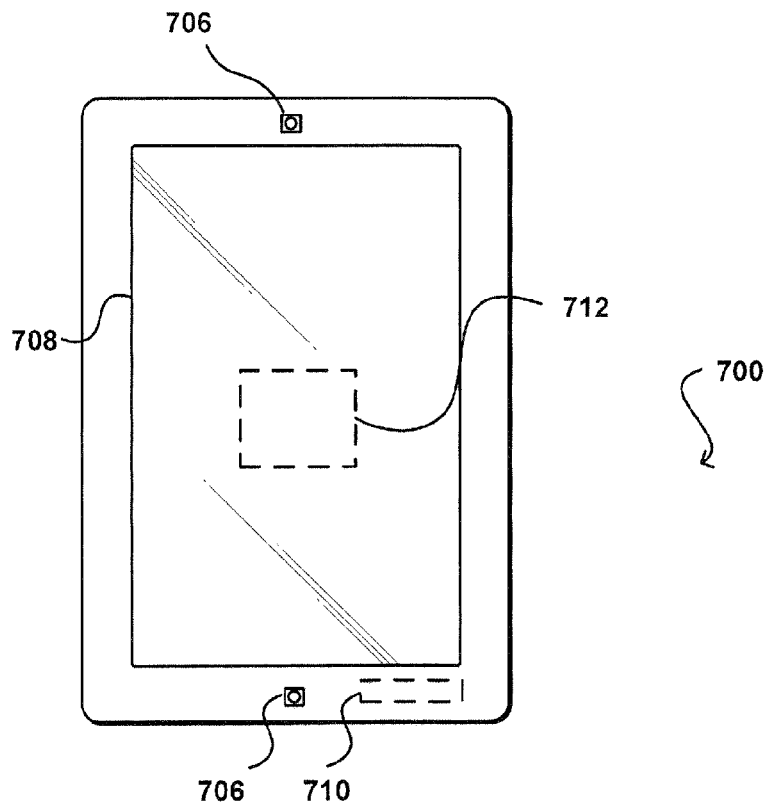
FIG. 7 illustrates an example of a computing device that can be used in accordance with various embodiments.

FIG. 7 illustrates an example computing device 700 that can be used to perform approaches described in accordance with various embodiments. In this example, the device includes two image capturing components 706 located at the top and bottom of a front face of the device and on the same surface as the display element 708, and enabling the device to capture images in accordance with various embodiments, such as images of a user viewing the display element and/or operating the device. The computing device includes audio input element 710, such as a microphone, to receive audio input from a user. In some embodiments, the audio data can be used in conjunction with other approaches to estimate the pose of the user. The computing device also includes an inertial measurement unit (IMU) 712, comprising a three-axis gyroscope, three-axis accelerometer, and magnetometer, that can be used to detect the motion of the device, from which position and/or orientation information can be derived.

Figure 8:
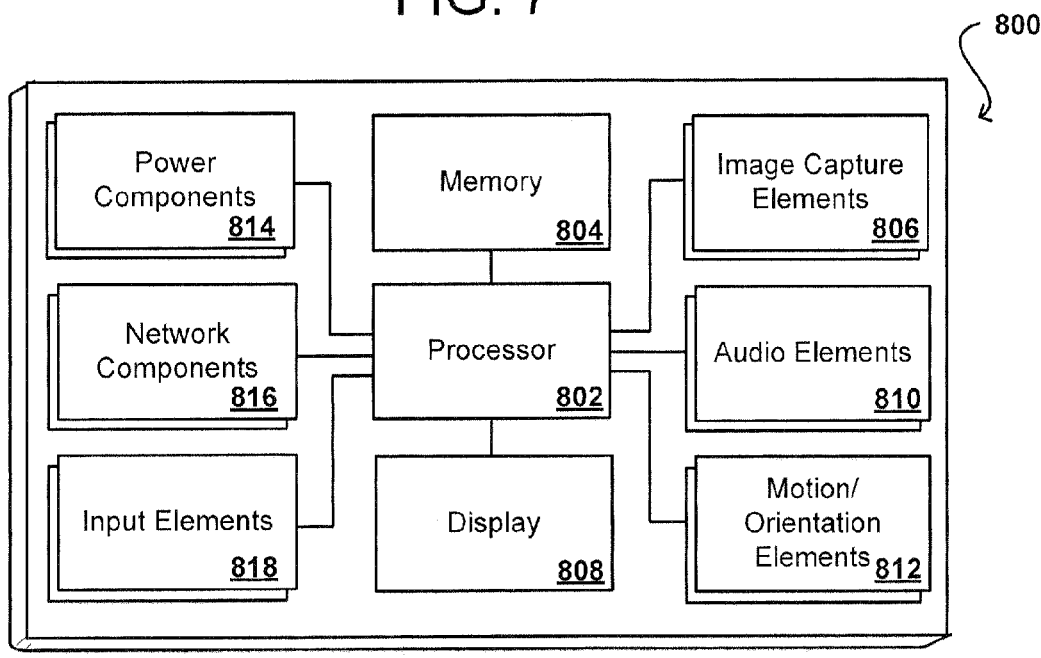
FIG. 8 illustrates an example configuration of components of a computing device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 808, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As discussed, the device in many embodiments will include one or more cameras or image sensors 806 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 800 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 814 known in the art for providing power to a computing device, which can include capacitive charging elements for use with a power pad or similar device. The computing device can include one or more communication elements or networking sub-systems 816, such as a Wi-Fi, Bluetooth, RF, wired, or wireless communication system. The device in many embodiments can communicate with a network, such as the Internet, and may be able to communicate with other such devices. In some embodiments the device can include at least one additional input device 818 able to receive conventional input from a user. This conventional input can include, for example, a push button, touch pad, touchscreen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include one or more orientation and/or motion sensors 812. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

In some embodiments, the device 800 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 800 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 800 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining a portion of image data to initiate detection of one or more representations of an object in the image data based at least in part upon first motion data from at least one inertial sensor;
   determining, at a first rate, first position data associated with the object relative to at least one display screen by initiating detection of one or more representations of the object in the portion of the image data;
   determining, at a second rate greater than the first rate, second position data associated with the object relative to a latest determined position of the first position data based at least in part upon second motion data from the at least one inertial sensor; and
   adjusting content displayed on the at least one display screen in response to determining that a change between a latest determined position of the second position data and a previously determined position of the second position data satisfies a threshold.

2. The computer-implemented method of claim 1, further comprising:
   determining one or more regions of the image data that exclude a representation of the object based at least in part upon the first motion data; and
   bypassing the one or more regions for determining the latest determined position of the first position data.

3. A non-transitory computer-readable storage medium storing instructions, the instructions, upon being executed by a processor, causing a computing system to:
   determine a first portion of image data that excludes a representation of an object based at least in part upon first motion data from at least one inertial sensor;
   determine, at a first rate, first position data associated with the object relative to at least one display screen by analyzing a second portion of the image data that excludes the first portion of the image data;
   determine, at a second rate, second position data associated with the object relative to a latest determined position of the first position data based at least in part upon second motion data from the at least one inertial sensor; and
   adjust content displayed on the at least one display screen in response to determining that a change between a latest determined position of the second position data and a previously determined position of the second position data satisfies a threshold.

4. The non-transitory computer-readable storage medium of claim 3, wherein the instructions when executed further cause the computing system to:
   determine a third portion of the image data that includes the representation of the object based at least in part upon the first motion data; and
   initiate detection of the representation of the object in the third portion of the image data.

5. A computing system, comprising:
   at least one processor;
   at least one camera;
   at least one sensor;
   at least one display screen; and
   memory including instructions that, upon being executed by the at least one processor, cause the computing system to:
      determine a portion of image data, captured by the at least one camera, to initiate detection of one or more representations of an object in the image data based at least in part upon first motion data from the at least one sensor;
      determine, at a first rate, first position data associated with the object relative to the at least one display screen by initiating detection of one or more representations of the object in the portion of the image data;
      determine, at a second rate, second position data associated with the object relative to a latest determined position of the first position data based at least in part upon second sensor data from the at least one sensor; and
      adjust content displayed on the at least one display screen in response to determining that a change between a latest determined position of the second position data and a previously determined position of the second position data satisfies a threshold.

6. The computing system of claim 5, wherein the instructions when executed further cause the computing system to:
   determine one or more regions of the image data that exclude a representation of the object based at least in part upon the first motion data; and
   bypass the one or more regions for determining the latest determined position of the first position data.

7. The computer-implemented method of claim 1, further comprising obtaining three-dimensional positional data using at least one of structured lighting, a proximity sensor, a distance sensor, a depth sensor, a range finder, an ultrasonic transceiver, or stereo disparity between a first image and a second image.

8. The computer-implemented method of claim 1, further comprising:
  determining that the object is not within a field of view of a camera; and
  suspending a tracking process for the object using the image data.

9. The computer-implemented method of claim 8, further comprising:
  determining that the object is within the field of view of the camera; and
  resuming the tracking process for the object using the image data.

10. The computer-implemented method of claim 1, further comprising:
  determining an amount of ambient light from an ambient light sensor; and
  selecting, based at least in part on the amount of ambient light, a tracking process for the object.

11. The computer-implemented method of claim 1, further comprising applying a Kalman filter using the first position data and the second position data.

12. The non-transitory computer-readable storage medium of claim 3, further comprising obtain three-dimensional positional data using at least one of structured lighting, a proximity sensor, a distance sensor, a depth sensor, a range finder, an ultrasonic transceiver, or stereo disparity between a first image and a second image.

13. The non-transitory computer-readable storage medium of claim 3, further comprising:
  determine that the object is not within a field of view of a camera; and
  suspend a tracking process for the object using the image data.

14. The non-transitory computer-readable storage medium of claim 13, further comprising:
  determine that the object is within the field of view of the camera; and
  resume the tracking process for the object using the image data.

15. The non-transitory computer-readable storage medium of claim 3, further comprising:
  determine an amount of ambient light from an ambient light sensor; and
  select, based at least in part on the amount of ambient light, a tracking process for the object.

16. The non-transitory computer-readable storage medium of claim 3, further comprising apply a Kalman filter using the first position data and the second position data.

17. The computing system of claim 5, wherein the instructions when executed further cause the computing system to:
  obtain three-dimensional positional data using at least one of structured lighting, a proximity sensor, a distance sensor, a depth sensor, a range finder, an ultrasonic transceiver, or stereo disparity between a first image and a second image.

18. The computing system of claim 5, wherein the instructions when executed further cause the computing system to:
  determine that the object is not within a field of view of the camera; and
  suspend a tracking process for the object using the image data.

19. The computing system of claim 18, wherein the instructions when executed further cause the computing system to:
  determine that the object is within the field of view of the camera; and
  resume the tracking process for the object using the image data.

20. The computing system of claim 5, further comprising an ambient light sensor, wherein the instructions when executed further cause the computing system to:
  determine an amount of ambient light from the ambient light sensor; and
  select, based at least in part on the amount of ambient light, a tracking process for the object.

21. The computing system of claim 5, wherein the instructions when executed further cause the computing system to:
  apply a Kalman filter using the first position data and the second position data.

* * * * *